(12) United States Patent
Candelaria, Jr.

(10) Patent No.: US 8,387,610 B1
(45) Date of Patent: Mar. 5, 2013

(54) GRILL ASSEMBLY

(76) Inventor: Robert L. Candelaria, Jr., Rangley, CO (US)

(*) Notice: Subject to any disclaimer, the term of this patent is extended or adjusted under 35 U.S.C. 154(b) by 466 days.

(21) Appl. No.: 12/802,130

(22) Filed: Jun. 1, 2010

(51) Int. Cl.
*F24B 3/00* (2006.01)

(52) U.S. Cl. .......... 126/25 R; 126/276; 126/26; 126/30; 126/40; 126/50

(58) Field of Classification Search ............... 126/25 R, 126/276, 26, 30, 9 R, 9 B, 41 R, 40, 50; 108/44; 224/519; 248/231.21, 352; 280/502
See application file for complete search history.

(56) References Cited

U.S. PATENT DOCUMENTS

| | | | |
|---|---|---|---|
| 5,640,949 A | 6/1997 | Smith | |
| 6,189,528 B1 * | 2/2001 | Oliver | 126/25 R |
| 6,354,286 B1 | 3/2002 | Davis | |
| 6,588,418 B1 | 7/2003 | Loving | |
| 6,877,505 B1 | 4/2005 | Den Hoed | |
| D566,631 S | 4/2008 | Shahan | |
| 2001/0042545 A1 | 11/2001 | Robin | |
| 2003/0019492 A1 * | 1/2003 | Williams | 126/41 R |
| 2004/0112369 A1 * | 6/2004 | LeDuc et al. | 126/276 |

* cited by examiner

*Primary Examiner* — Alfred Basichas

(57) ABSTRACT

A grill assembly for attachment to a trailer hitch includes a support post including a trailer hitch received segment having a trailer hitch received end and a grill mounting segment. A convertible grill includes a lower portion that has a back side, a front side, a first end, an open second end, and a bottom side. A charcoal grill insert has a first semicircular end, a second semicircular end, and an exterior wall extending between the ends. The charcoal grill insert can be inserted into the opening so that the convertible grill can be used as a charcoal grill. A propane grill insert has a first crescent end, a second crescent end, and an outside wall extending between the ends. The propane grill can be inserted into the opening and the convertible grill be used as a propane grill.

17 Claims, 5 Drawing Sheets

GRILL ASSEMBLY

BACKGROUND OF THE DISCLOSURE

Field of the Disclosure

The disclosure relates to grills and more particularly pertains to a new grill for attachment to an all terrain vehicle.

SUMMARY OF THE DISCLOSURE

An embodiment of the disclosure meets the needs presented above by generally comprising a convertible grill assembly for a vehicle-mounted trailer hitch, including a support post with a trailer hitch received segment having a trailer hitch received end, a grill mounting segment positioned perpendicular to the trailer hitch received segment, and an intermediate segment connecting the grill mounting segment to the trailer hitch received segment. The intermediate segment is joined to the trailer hitch received segment and to the grill mounting segment at approximately a 45 degree angle. The grill mounting segment has an opening therein. A convertible grill includes a lower portion that has a back side, a front side, a first end, an open second end, and a bottom side. The lower portion has an interior surface and an exterior surface. The front side and a front edge opposite the bottom side, the back side has a back edge opposite the bottom side. A plurality of front grate supports are attached to and extending inwardly from the interior surface adjacent the front edge. A plurality of back grate supports is attached to and extending inwardly from the interior surface of the back side adjacent to the back edge. The open second end has a set nut attached thereto adjacent the bottom side. A grill mount is attached, to and extending away from the exterior surface. The grill mount is configured to be received by the grill mounting portion. The grill also includes an upper portion hinged to the lower portion. The upper portion has a back wall, a front wall, a first side end, a second side end, a top wall, an inner surface and an outer surface. The front wall has a lower front edge and the back wall has a lower back edge. A handle is attached to the front wall adjacent to the lower front edge. A charcoal grill insert has a first semicircular end, a second semicircular end, and an exterior wall extending therebetween. The exterior wall has a semicircular cross section taken on a line extending through the first and second semicircular ends. A handle is attached to the second semicircular end and a vent is mounted in the second semicircular end. A set screw extending through the first semicircular end and is received by the set nut. The charcoal grill insert is inserted into the opening so that the convertible grill can be used as a charcoal grill. A propane grill insert has a first crescent end, a second crescent end, and an outside wall extending therebetween. The outside wall has elongated vent slots extending therethrough. The outside wall has a semicircular cross section taken on a line extending through the first and second crescent ends and the propane grill insert has a propane burner extending between the first and second crescent ends, the second crescent end has a handle attached thereto. A set screw extends through the second crescent end and is received by the set nut, so that the propane grill can be inserted into the opening and the convertible grill be used as a propane grill.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
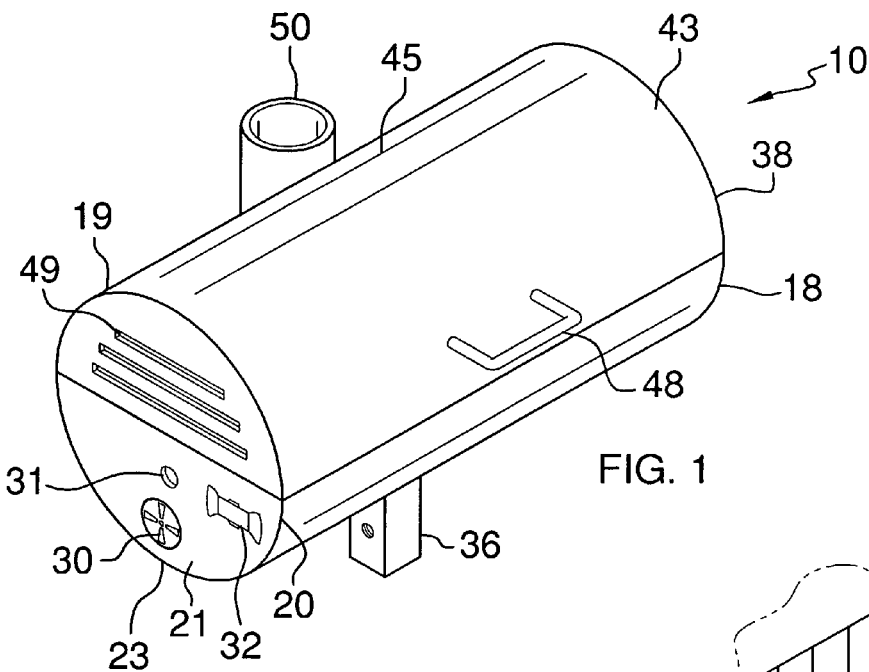
FIG. 1 is a front isometric view of a grill assembly according to an embodiment of the disclosure.
Figure 2:
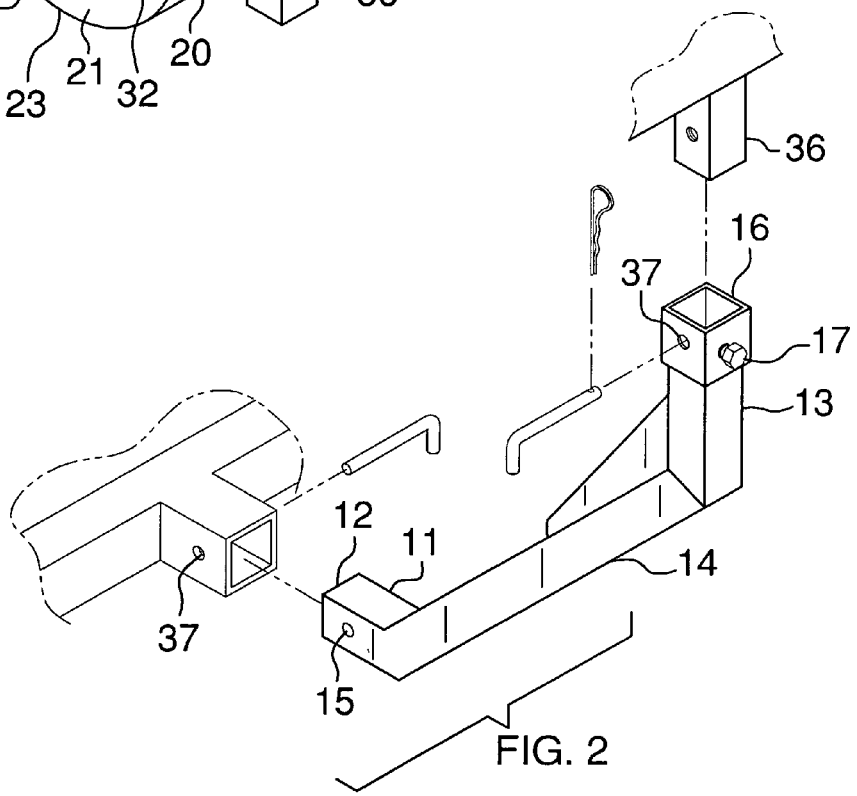
FIG. 2 is a front isometric view of an embodiment of the disclosure.
Figure 3A:
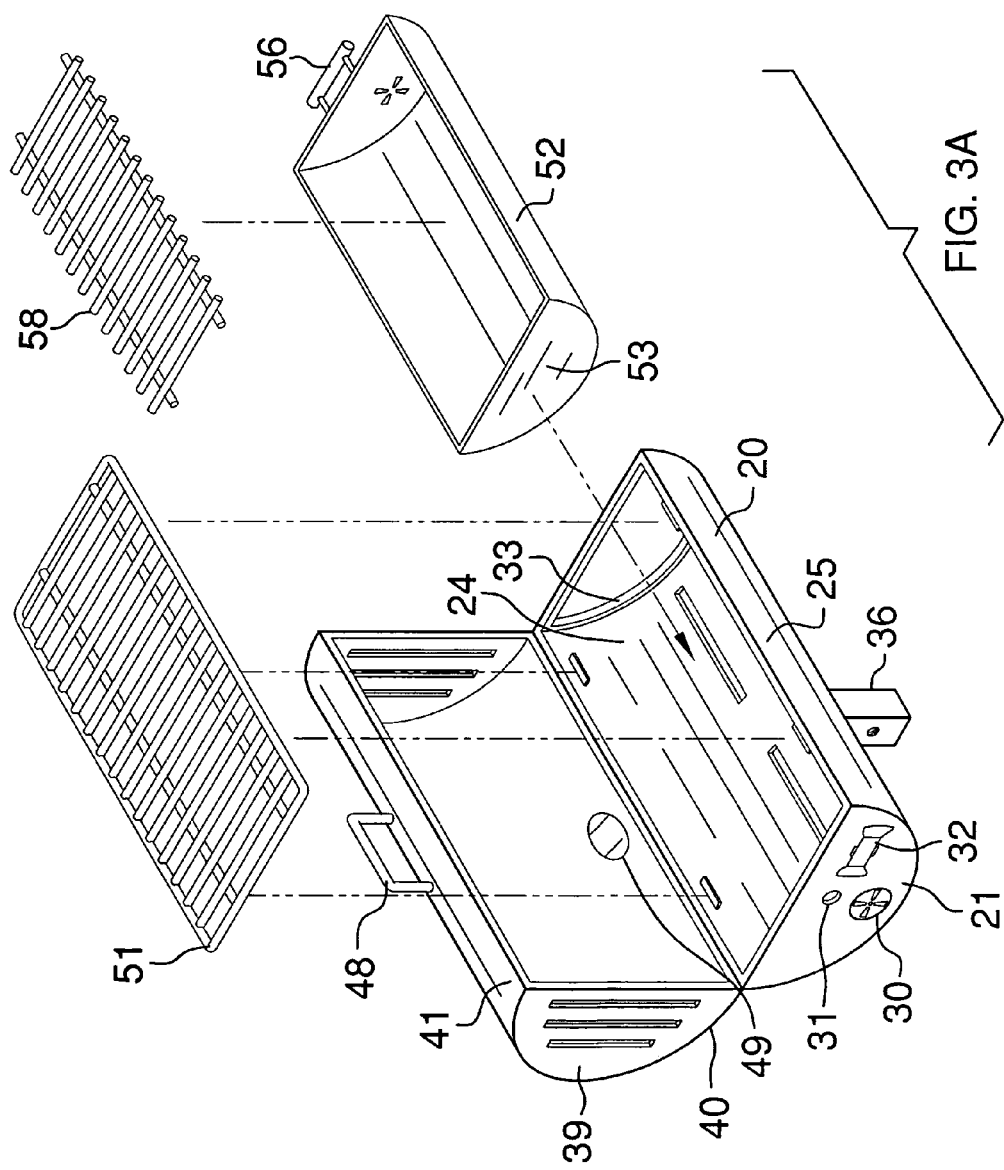
FIG. 3*a* is an expanded front isometric view of an embodiment of the disclosure.
Figure 3B:
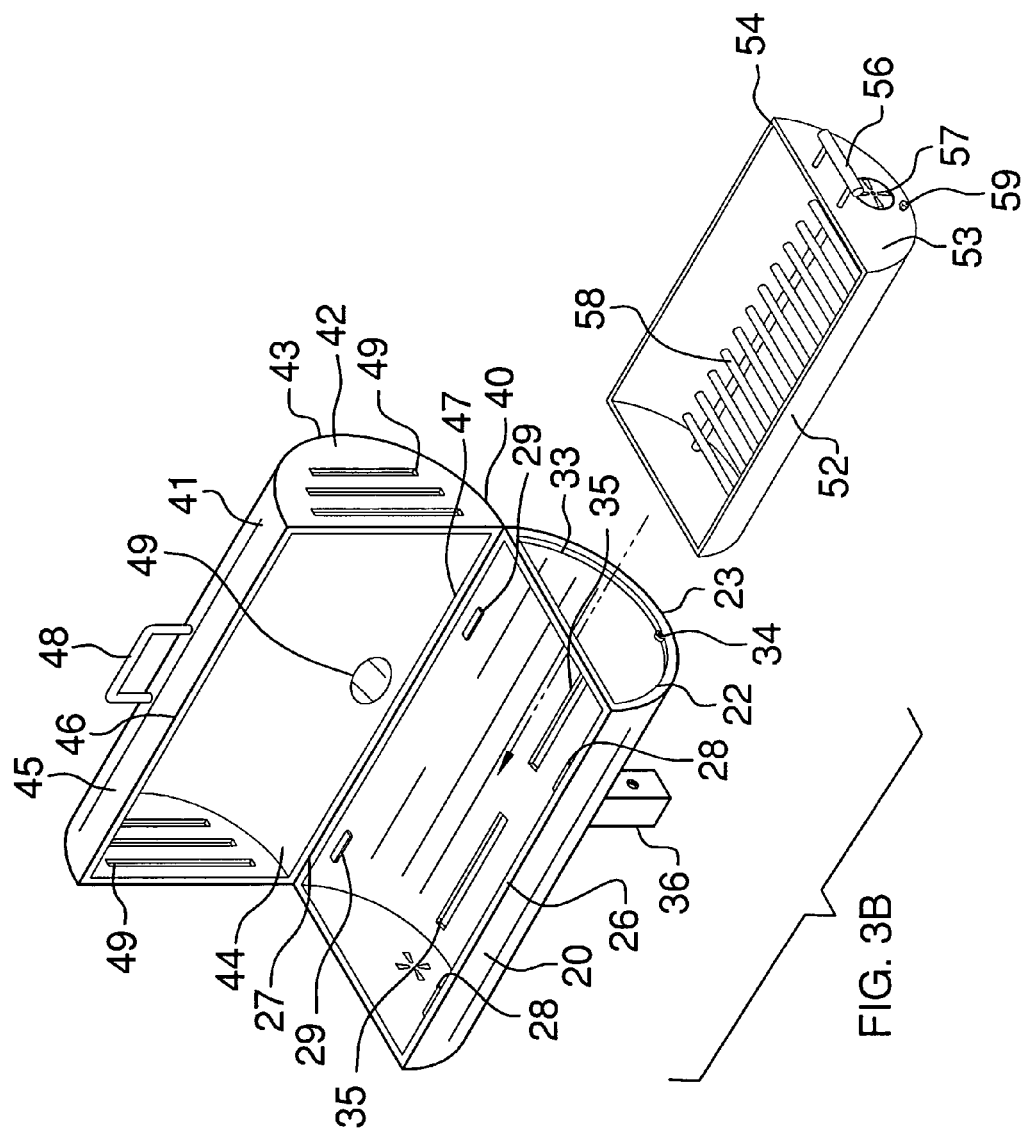
FIG. 3*b* is an expanded front isometric view of an embodiment of the disclosure.
Figure 4:
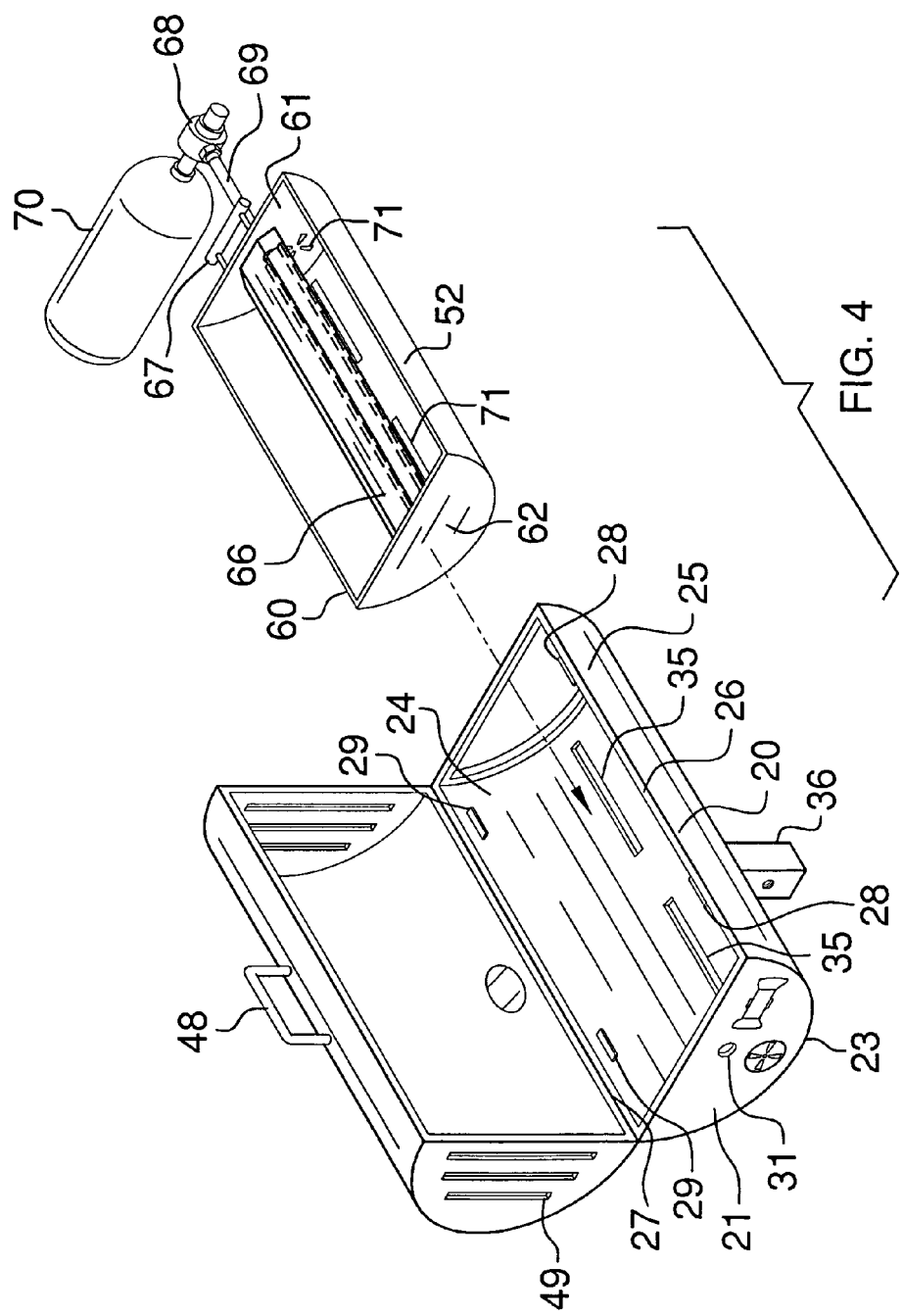
FIG. 4 is an expanded front isometric of an embodiment of the disclosure.
Figure 5:
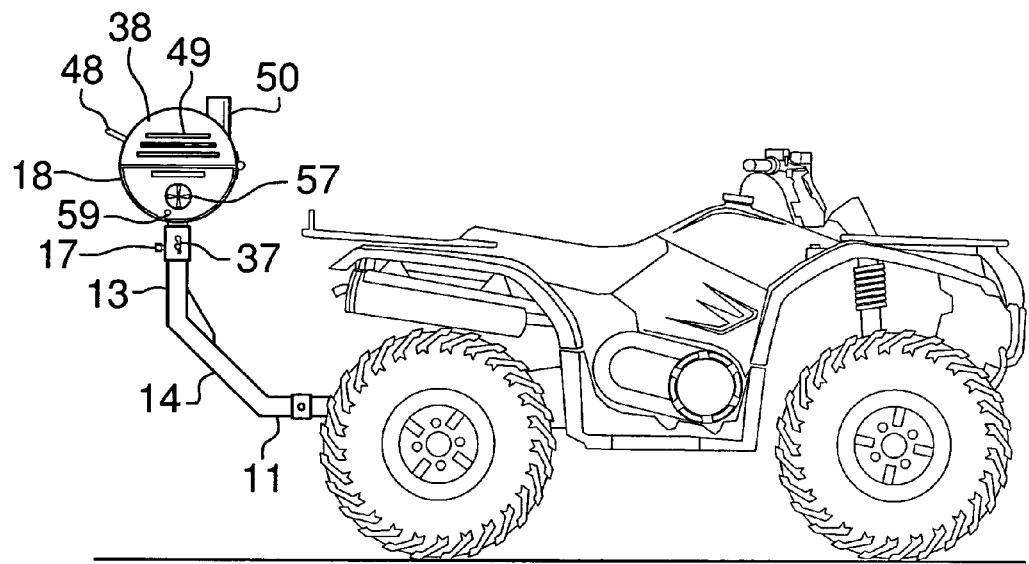
FIG. 5 is a side view of an embodiment of the disclosure.
Figure 6:
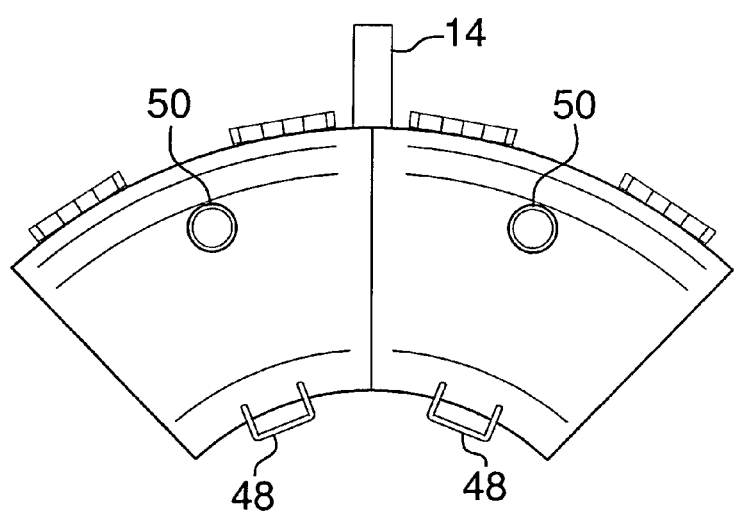
FIG. 6 is a top view of an embodiment of the disclosure.

With reference now to the drawings, and in particular to FIGS. 1 through 6 thereof, a new grill embodying the principles and concepts of an embodiment of the disclosure and generally designated by the reference numeral 10 will be described.

As best illustrated in FIGS. 1 through 6, the grill assembly 10 generally comprises As best illustrated in FIGS. 1 through 6, the grill assembly 10 generally comprises a support post that includes a trailer hitch received segment 11 having an end 12 that is received by a receiver hitch. The assembly 10 further comprises a grill mounting segment 13 positioned perpendicular to the trailer hitch received segment 11 and an intermediate segment 14 that connects the grill mounting segment 13 to the trailer hitch received segment 11. The intermediate segment 14 is joined to the trailer hitch received segment 11 and to the grill mounting segment 13 at an approximately 45 degree angle. According to an exemplary embodiment, the trailer hitch received segment 11, the intermediate segment 14 and the grill mounting segment 13 may be continuously formed. The trailer hitch received segment 11 is adapted for attachment to the vehicle-mounted trailer hitch. An end of the trailer hitch received segment 11 is inserted into a receiver hitch, and a pin is used to secure the support post in place. The trailer hitch received end 12 has a pair of hitch securing apertures 15 for receiving the pin. The grill mounting segment 13 has an opening 16 for receiving a mounting device attached to a grill 19. It can be appreciated by one skilled in the art that although the mounting segments are shown as box channels, mounting segments having any cross-sectional shape could be employed. The grill mounting segment 13 has a tightening device 17 that includes a threaded nut and bolt. The hitch securing apertures 15 match up to securing apertures 37 in the trailer hitch when the trailer hitch received segment 11 is inserted in the trailer hitch.

A convertible grill 19 attaches to the support post, and includes a lower portion 18 that has a back side, a front side 20, a first end 21, an open second end 22, and a bottom side 23.

The lower portion 18 has an interior surface 24 and an exterior surface 25. The front side 20 and a front edge 26 are positioned opposite the bottom side 23. The back side has a back edge 27 opposite the bottom side 23. A plurality of front grate supports 28 is attached to and extends inwardly from the interior surface 24 adjacent the front edge 26. A plurality of back grate supports 29 is attached to and extends inwardly from the interior surface 24 of the back side, adjacent to the back edge 27. An adjustable vent 30 extends through the interior surface 24 and the exterior surface 25 of the first end 21 for modulating the flow of air into the grill when it is in operation. The first end 21 has a hole 31 extending through the interior surface 24 and the exterior surface 25, located between the front side 20 and the back side. The first end 21 has a bottle opener 32 attached to the exterior surface 25, such as the kind used to open a glass bottle of beer or other similarly packaged beverages. The open second end 22 has an opening 33 extending through it along with a set nut 34 adjacent the bottom side 23. The bottom side 23 has elongated slits 35 extending therethrough.

A grill mount 36 is attached to and extends away from the exterior surface 25 of the bottom side 23. The grill mount 36 has a square profile that is configured to be received by the grill mounting portion 13. As indicated, one skilled in the art will recognize that the shape profile of the grill mount 36 may be a variety of shapes in order that the mount can be received by the support post. The grill mount 36 has grill mount 36 securing aperture 37, which may include a screw for tightening the grill mount 36 to the grill mounting segment 13. The lower portion 18 has a first longitudinal axis extending between the first end 21 and the second end 22. The lower portion 18 has a semicircular cross section when taken in a plane perpendicular to the first longitudinal axis. The grill mount 36 receiving apertures match up with the grill securing apertures 37 when the grill mount 36 is inserted into the grill mounting segment 13.

An upper portion 38 is hinged to the lower portion 18 of the grill. The upper portion 38 has a back wall 40, a front wall 41, a first side end 39, a second side end 42 and a top wall 43. The upper portion 38 has an inner surface 44 and an outer surface 45. The front wall 41 has a lower front edge 46 and the back wall 40 has a lower back edge 47. A handle 48 is attached to the front wall 41 adjacent to the lower front edge 46 for lifting the upper portion 38 away from the lower portion. Vents 49 extend through the inner surface 44 and the outer surface 45 of the first and second side ends in order to regulate airflow in to and out of the grill. The upper portion 38 has a second longitudinal axis extending between the first side end 39 and the second side end 42 and a semicircular cross section when taken in a plane perpendicular to that second longitudinal axis. A tubular chimney 50 is attached to the upper portion 38 and extends vertically away from the outer surface 45, the tubular chimney 50 is in fluid communication with the inner surface 44 and is positioned adjacent the lower back edge 47.

A rectangular grate 51 has a perimeter shape for resting on the front grate supports 28 and the back grate supports 29 of the grill. The rectangular grate 51 can be used as a grilling surface, and can be replaced with grates of other configurations (e.g., a griddle).

A charcoal grill insert 54 has a first semicircular end 55, a second semicircular end 53, and an exterior wall 52 extending therebetween. The charcoal insert 54 is inserted into the open second end 22 to configure the grill 19 as a charcoal grill. The exterior wall 52 has a semicircular cross section taken on a line extending through the first and second semicircular ends. A handle 56 is attached to the second semicircular end 53 of the charcoal grill insert 54, and a vent 57 is mounted in the second semicircular end 53. The charcoal grill insert 54 has a charcoal grate 58 extending between the first and second semicircular ends. A set screw 59 extends through the first semicircular end 55 and is received by the set nut 34.

A propane grill insert 60 has a first crescent end 62, a second crescent end 61, and an outside wall 63 extending therebetween. The propane grill insert 60 is inserted into the second end opening 33 to configure the grill 19 as a propane grill. The outside wall 63 has elongated vent slots 71 and a semicircular cross section taken on a line extending through the first and second crescent ends. The propane grill insert 60 has a propane burner extending between the first and second crescent ends. A heat grate protector 66 extends between the first and second crescent ends for covering the propane burner. The second crescent end 61 has a handle 67 attached to it for inserting and removing the propane grill insert 60. A propane regulator 68 has a supply line 69 extending through the second crescent end 61 and is attached to the propane burner. The propane regulator 68 is attached to a propane source 70. A propane vent 74 is in the second crescent end 61. A set screw extends through the second crescent end 61 and is received by the set nut 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A convertible grill assembly for a vehicle-mounted trailer hitch, said assembly including:
    a support post including a trailer hitch received segment having a trailer hitch received end, a grill mounting segment positioned perpendicular to said trailer hitch received segment, and an intermediate segment connecting said grill mounting segment to said trailer hitch received segment, said intermediate segment being joined to said trailer hitch received segment and to said grill mounting segment at approximately a 45 degree angle, said grill mounting segment having an opening;
    a convertible grill comprising:
        a lower portion having a back side, a front side, a first end, an open second end, and a bottom side, said lower portion having an interior surface and an exterior surface, said front side and a front edge opposite said bottom side, said back side having a back edge opposite said bottom side, a plurality of front grate supports being attached to and extending inwardly from said interior surface adjacent said front edge, a plurality of back grate supports being attached to and extending inwardly from said interior surface of said back side adjacent to said back edge, said open second end having a set nut attached thereto adjacent said bottom side, a grill mount being attached to and extending away from said exterior surface, said grill mount being configured to be received by said grill mounting portion; and an upper portion being hinged to said lower portion, said upper portion having a back wall, a front wall, a first side end, a second side end and a top wall, said upper portion having an inner surface and an outer surface, said front wall having an lower front edge, said back wall having a lower back edge, a handle being attached to said front wall adjacent to said lower front edge;

a charcoal grill insert having a first semicircular end, a second semicircular end, and an exterior wall extending therebetween, said exterior wall having a semicircular cross section taken on a line extending through said first and second semicircular ends, a handle being attached to said second semicircular end, a vent being mounted in said second semicircular end, a set screw extending through said first semicircular end and being received by said set nut, wherein said charcoal grill insert is inserted into said opening so that said convertible grill can be used as a charcoal grill; and a propane grill insert having a first crescent end, a second crescent end, and an outside wall extending therebetween, said outside wall having elongated vent slots extending therethrough, said outside wall having a semicircular cross section taken on a line extending through said first and second crescent ends, said propane grill insert having a propane burner extending between said first and second crescent ends, said second crescent end having a handle attached thereto, a set screw extending through said second crescent end for being received by said set nut, wherein said propane grill insert is inserted into said opening so that said convertible grill can be used as a propane grill.

2. The assembly of claim 1, wherein said trailer hitch received end is adapted for attachment to the vehicle-mounted trailer hitch, said trailer hitch received end having a pair of hitch securing apertures therein.

3. The assembly of claim 1, wherein said grill mounting segment has a tightening device therein, said tightening device comprising a threaded nut and bolt.

4. The assembly of claim 1, wherein said lower portion further comprising an adjustable vent extending through said interior surface and said exterior surface of said first end.

5. The assembly of claim 1, wherein said first end has a bottle opener attached to said exterior surface, said open second end having an opening extending therethrough.

6. The assembly of claim 1, wherein said bottom side has elongated slits extending therethrough.

7. The assembly of claim 1, said lower portion further comprising said grill mount having a square profile, said grill mount having grill mount securing apertures therein; and wherein said grill mount receiving apertures match up with said grill securing apertures when said grill mount is inserted into said grill mounting portions.

8. The assembly of claim 1, wherein said lower portion has a first longitudinal axis extending between said first end and said second end, said lower portion having a semicircular cross section when taken in a plane perpendicular to said first longitudinal axis.

9. The assembly of claim 1, wherein said upper portion has a vent extending through said inner surface and said outer surface of said first and second side ends.

10. The assembly of claim 1, wherein said upper portion has a second longitudinal axis extending between said first side end and said second side end, said upper portion having a semicircular cross section when taken in a plane perpendicular to said second longitudinal axis.

11. The assembly of claim 1, said upper portion further comprising a tubular chimney being attached to said upper portion and extending vertically away from said outer surface, said tubular chimney being in fluid communication with said inner surface.

12. The assembly of claim 11, wherein said tubular chimney is positioned adjacent said lower back edge.

13. The assembly of claim 1, said convertible grill further comprising a rectangular grate having a perimeter shape for resting on said front grate supports and said back grate supports.

14. The assembly of claim 1, wherein said charcoal grill insert has a charcoal grate extending between said first and second semicircular ends.

15. The assembly of claim 1, wherein said propane grill insert has a heat grate protector extending between said first and second crescent ends for covering said propane burner.

16. The assembly of claim 1, said propane grill insert further comprising a propane regulator having a supply line extending through said second crescent end and being attached to said propane burner, said propane regulator having a propane source attached thereto.

17. A convertible grill assembly for a vehicle-mounted trailer hitch, said assembly including:

a support post including a trailer hitch received segment having a trailer hitch received end, a grill mounting segment positioned perpendicular to said trailer hitch received segment, and an intermediate segment connecting said grill mounting segment to said trailer hitch received segment, said intermediate segment being joined to said trailer hitch received segment and to said grill mounting segment at approximately a 45 degree angle, said trailer hitch received end being adapted for attachment to the vehicle-mounted trailer hitch, said trailer hitch received end having a pair of hitch securing apertures therein, said grill mounting segment having an opening, said grill mounting segment having a tightening device therein, said tightening device comprising a threaded nut and bolt, wherein said hitch securing apertures match up to securing apertures in the trailer hitch when said trailer hitch received segment is inserted in the trailer hitch;

a convertible grill comprising:

a lower portion having a back side, a front side, a first end, an open second end, and a bottom side, said lower portion having an interior surface and an exterior surface, said front side and a front edge opposite said bottom side, said back side having a back edge opposite said bottom side, a plurality of front grate supports being attached to and extending inwardly from said interior surface adjacent said front edge, a plurality of back grate supports being attached to and extending inwardly from said interior surface of said back side adjacent to said back edge, an adjustable vent extending through said interior surface and said exterior surface of said first end, said first end having a hole extending through said interior surface and said exterior surface, said hole being located between said front side and said back side, said first end having a bottle opener attached to said exterior surface, said open second end having an opening extending therethrough, said open second end having a set nut attached thereto adjacent said bottom side, said bottom side having elongated slits extending therethrough, a grill mount being attached to and extending away from said exterior surface, said grill mount having a square profile, said grill mount being configured to be received by said grill mounting portion, said grill mount having grill mount securing apertures therein, said lower portion having a first longitudinal axis extending between said first end and said second end, said lower portion having a semicircular cross section when taken in a plane perpendicular to said first longitudinal axis, wherein said grill mount receiving apertures match up with said grill securing apertures when said grill mount is inserted into said grill mounting portions;

an upper portion being hinged to said lower portion, said upper portion having a back wall, a front wall, a first side end, a second side end and a top wall, said upper portion having an inner surface and an outer surface, said front wall having an lower front edge, said back wall having a lower back edge, a handle being attached to said front wall adjacent to said lower front edge, a vent extending through said inner surface and said outer surface of said first and second side ends, said upper portion having a second longitudinal axis extending between said first side end and said second side end, said upper portion having a semicircular cross section when taken in a plane perpendicular to said second longitudinal axis, a tubular chimney being attached to said upper portion and extending vertically away from said outer surface, said tubular chimney being in fluid communication with said inner surface, said tubular chimney being positioned adjacent said lower back edge; and a rectangular grate having a perimeter shape for resting on said front grate supports and said back grate supports; and a charcoal grill insert having a first semicircular end, a second semicircular end, and an exterior wall extending therebetween, said exterior wall having a semicircular cross section taken on a line extending through said first and second semicircular ends, a handle being attached to said second semicircular end, a vent being mounted in said second semicircular end, said charcoal grill insert having a charcoal grate extending between said first and second semicircular ends, a set screw extending through said first semicircular end and being received by said set nut, wherein said charcoal grill insert is inserted into said opening so that said convertible grill can be used as a charcoal grill; and a propane grill insert having a first crescent end, a second crescent end, and an outside wall extending therebetween, said outside wall having elongated vent slots extending therethrough, said outside wall having a semicircular cross section taken on a line extending through said first and second crescent ends, said propane grill insert having a propane burner extending between said first and second crescent ends, said propane grill insert having a heat grate protector extending between said first and second crescent ends for covering said propane burner, said second crescent end having a handle attached thereto, a propane regulator having a supply line extending through said second crescent end and being attached to said propane burner, said propane regulator having a propane source attached thereto, a vent being in said second crescent end, a set screw extending through said second crescent end for being received by said set nut, wherein said propane grill insert is inserted into said opening so that said convertible grill can be used as a propane grill.

* * * * *